July 28, 1959
F. E. DE MOTTE ET AL
2,897,489
CIRCUITS FOR IMPROVING THE STABILITY
OF ULTRASONIC DELAY LINES
Filed March 27, 1957
2 Sheets-Sheet 1
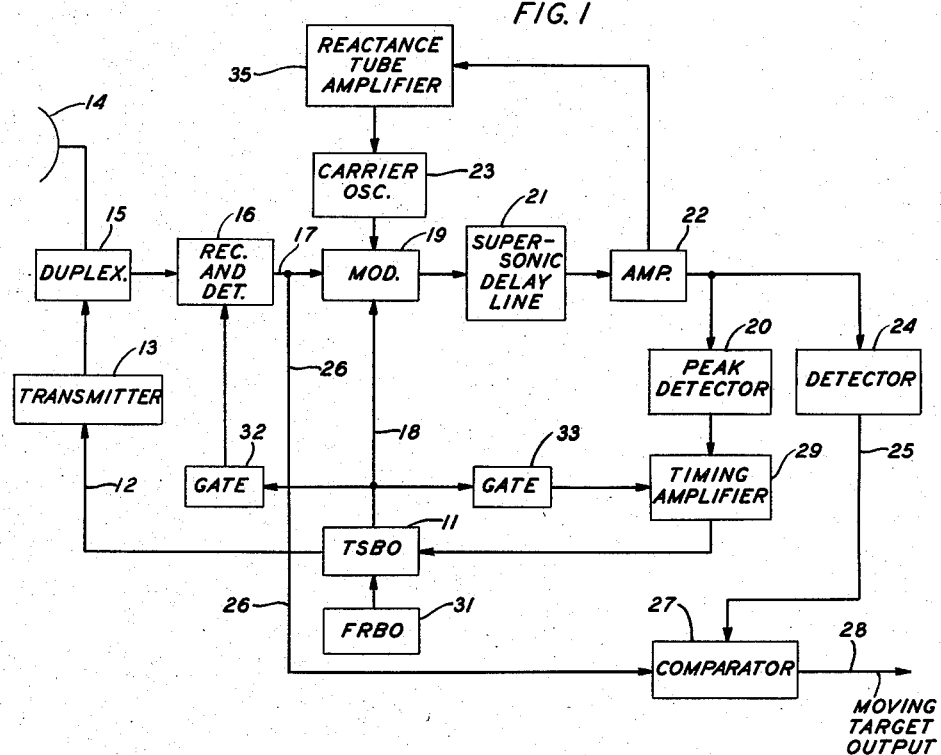
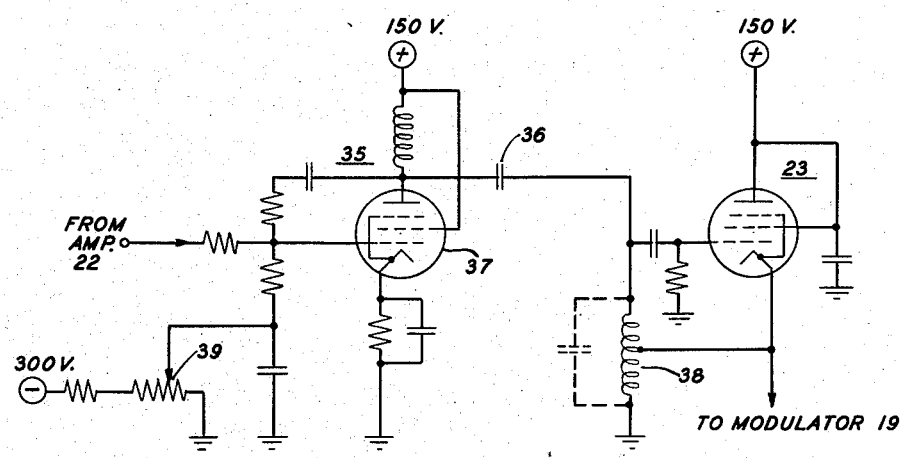
INVENTORS
F. E. DE MOTTE
E. C. DENTON
T. R. HOFFMAN
BY Walter M. Hill
ATTORNEY July 28, 1959

F. E. DE MOTTE ET AL 2,897,489

CIRCUITS FOR IMPROVING THE STABILITY
OF ULTRASONIC DELAY LINES

Filed March 27, 1957

INVENTORS  F. E. DE MOTTE
E. C. DENTON
T. R. HOFFMAN

BY *Walter M. Hill*

ATTORNEY

United States Patent Office 2,897,489
Patented July 28, 1959

2,897,489

CIRCUITS FOR IMPROVING THE STABILITY OF ULTRASONIC DELAY LINES

Frank E. De Motte, New Vernon, Eugene C. Denton, Morris Plains, N.J., and Thomas R. Hoffman, Schenectady, N.Y., assignors to Bell Telephone Laboratories, Incorporated, New York, N.Y., a corporation of New York Application March 27, 1957, Serial No. 648,943

10 Claims. (Cl. 343—7.7)

This invention relates to radar systems for the detection of moving objects and more particularly to means for improving the pulse-to-pulse stability of the timing and cancellation circuits of such systems.

The signals reflected to a radar antenna from targets moving in the presence of stationary reflecting surfaces have the differential characteristic over signals from stationary targets that they vary greatly and rapidly in amplitude. This particular characteristic has long been recognized, and numerous systems have been devised to present moving target signals on a radar indicator to the exclusion of signals from stationary targets. In such systems, it is customary to compare, in amplitude, the reflections from the same objects produced by successively transmitted impulses, the circuitry for accomplishing the same being designated "delay-and-cancellation."

In a "delay-and-cancellation" radar system, the video signals resulting from a transmitted pulse #1 are "stored" for a period of time until the radar video signals resulting from transmitted pulse #2 arrive at that point in the circuit where amplitude comparison is made. The stored signals maintain substantially their relative time relationship and are essentially undistorted when emerging from the storage device, so that, when added in opposite polarity to the pulse #2 signals, only amplitude difference signals or "cancelled residue" signals remain. Received radar signals from moving targets will, as stated above, possess a high rate of amplitude variation and thus will provide maximum "cancelled residue" signals. By applying the "cancelled residue" to suitable indicating means, moving targets can then be observed to the exclusion of stationary targets.

Practical application of this principle requires the timing and cancellation circuits of such systems to be extremely stable in order to cancel the constant amplitude signals from fixed targets, otherwise the "residue" from the fixed target comparisons would mask the moving target signals.

Accordingly, it is the object of the present invention to improve the fixed target cancellation of radar moving target indicating systems by increasing the pulse-to-pulse stability of the timing and cancellation circuits of such systems.

In accordance with the present invention, the trigger pulses sent to the radar transmitter are also supplied to a carrier generator for transmission of the pulses through a supersonic delay line, so that the pulse repetition frequency of the radar system may be continuously synchronized with the delay period in spite of changes in the time delay of the delay line. The frequency of the carrier generator is controlled by feeding back the delay line carrier output to the input of the carrier oscillator, thus phase locking the carrier signal to the signal emerging from the delay line. Since the pulse repetition frequency of the radar is also phase locked to the delay line, it follows that the carrier frequency maintains a constant phase relationship with respect to the trigger pulses. By the same token, the carrier frequency phase will also remain fixed in relation to the returned stationary target video signals from one radar cycle to the next. Thus, pulse-to-pulse shape and amplitude changes because of relative carrier frequency phase changes are eliminated, and the cancellation performance of the system is enhanced.

Other objects and many of the attendant advantages of the invention will be readily appreciated as the same becomes better understood by reference to the following detailed description when considered in connection with the accompanying drawings in which:

Fig. 1 is a schematic diagram in block form of a radar moving target indicating (MTI) system embodying the invention;

Fig. 2 is a circuit diagram of the carrier oscillator and reactance tube amplifier shown in block form in Fig. 1;

Figure 3:
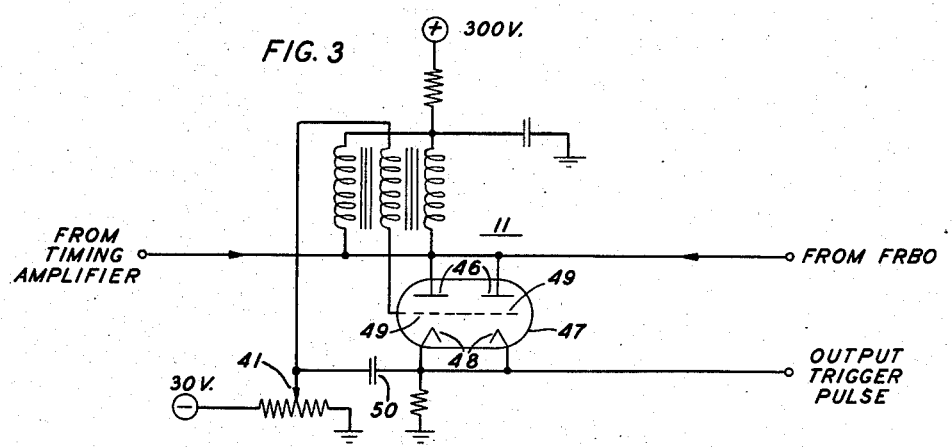
Fig. 3 is a circuit diagram of the timing signal blocking oscillator (TSBO) shown in block form in Fig. 1.

Referring now to Fig. 1, the timing signal blocking oscillator (TSBO) 11 generates timing signal pulses in response to input pulses and these timing signal pulses are supplied through connection 12 to trigger the transmitter 13 and control the production thereby of successive pulses of energy in the microwave frequency range. This microwave energy is coupled to antenna 14, through duplexer 15, and thence radiated into space in a direction determined by the antenna orientation. Should the transmitted pulse energy impinge upon one or more objects, energy will be reflected therefrom and subsequently will be intercepted by antenna 14. These intercepted or received signals are then supplied through duplexer 15 to a conventional receiver and detector 16.

The radar video signals from the receiver and detector 16 and the pulses from the blocking oscillator 11 are supplied respectively through connections 17 and 18 to a modulator 19 and thence to supersonic delay line 21. Supersonic delay line 21 comprises, for example, a circular quartz slab ground with many reflecting surfaces on its perimeter and driven by a piezoelectric crystal. When this crystal is energized by a signal it beams mechanical vibration energy into the quartz slab which is reflected from facet to facet until a total length of approximately eight feed (delay time of approximately 500 microseconds) has been traversed within the quartz. At this point the beam strikes an output piezoelectric crystal which transforms the mechanical vibration energy back into electrical energy for amplification in the amplifier 22 which follows. There are also other arrangements, such as the ultrasonic mercury delay line, well known in the prior art for providing relatively long time delays of electrical signals.

For such a delay device to operate efficiently, it is necessary that the input signals supplied thereto comprise frequency components within a particular range. If the frequency components of the signals to be delayed do not lie within this range, it is customary to modulate them first with a signal having a carrier frequency within that range. In the present instance, the delay device possesses a pass-band around twenty megacycles and accordingly a twenty megacycle carrier is supplied to modulator 19 from oscillator 23. The radar video signals and the pulses from blocking oscillator 11 modulate the carrier signal and the modulated signal thus produced is supplied to the input of the supersonic delay line 21. The delayed output from the supersonic delay line is coupled to amplifier 22 which is included for the purpose of restoring, to a suitable level, the signal which will have undergone attenuation in the course of passage through the supersonic delay line. The output of amplifier 22 is connected to detector 24 which converts it to the video form existing in the input to modulator 19.

As is customary in MTI systems, delayed signals from detector 24 and undelayed signals from detector 16 are fed respectively through connections 25 and 26 to a suitable comparator 27 which is adapted to subtract one signal from the other and to yield a resultant signal comprising only, or primarily, signals indicative of the presence of moving targets. The amplitude difference signals or "cancelled residue" derived from comparator 27 can be supplied through connection 28 to any suitable form of indicator or other apparatus adapted to utilize the moving target output.

In accordance with the invention, the output from amplifier 22 is also supplied to the peak detector 20 and thence to timing amplifier 29. The timing amplifier acts, in response to a predetermined gating signal later to be described, to pass on the delayed timing signal pulse to the input of the timing signal blocking oscillator 11. This delayed pulse serves as a trigger pulse for blocking oscillator 11, which is adapted to respond thereto to generate a successive pulse for retriggering the transmitter 13 and initiating a new cycle of operation. Thus, the pulse repetition frequency of the radar transmitter is accurately controlled by the delay characteristics of the supersonic delay line.

Since time stability of the triggering action is important, the blocking oscillator 11 is biased so that it will not fire unless triggered by an input pulse. It is necessary therefore to provide means for initiating the first cycle of operation after the system is turned on. To this end, a free running blocking oscillator (FRBO) 31 is coupled to blocking oscillator 11. When the system is first turned on, the FRBO generates a pulse causing a pulse to be produced by TSBO 11. The FRBO is designed to free-run at a slower repetition rate than that determined by delay line 21 and hence, after the initial triggering, the TSBO is thereafter triggered by the pulse emerging from the delay line. After the initial triggering, the FRBO has no further effect on the timing since it does not have time to recover between successive triggered oscillations and each of the latter serves to "reset" the FRBO.

Figure 4:
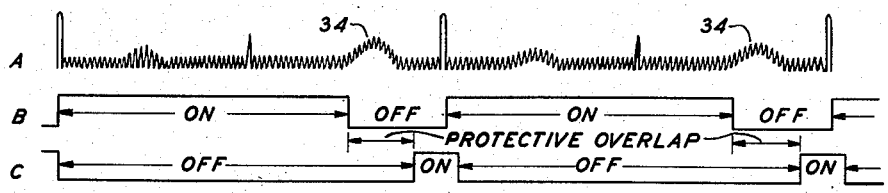
Fig. 4 is a series of typical waveforms that might be obtained at selected points in the circuit of Fig. 1.

As a further means of insuring a high degree of triggering action time stability, a gating arrangement is used which serves to prevent the false triggering of the blocking oscillator 11 by noise or video signals. A consideration of the operation of this gating arrangement will be facilitated by reference to the waveforms illustrated in Fig. 4. Curve 4A represents the waveform appearing at the input to the receiver and detector 16; curve 4B represents the waveform of the gating signal applied to the receiver and detector 16 from the gate 32; and curve 4C represents the waveform of the gating signal applied to the timing amplifier 29 from the gate 33.

Without any gating arrangement the blocking oscillator 11 could be triggered by a signal such as that indicated at 34 of curve 4A, or its exact instant of triggering could be affected by a small noise or video signal superimposed on the leading edge of the delayed timing signal trigger pulse. However, as will be appreciated by those skilled in the art, with the gate signals corresponding to curves 4B and 4C applied respectively to the receiver and detector 16 and timing amplifier 29, these deleterious noise and video signals are gated out and hence the possibility of a false triggering of the blocking oscillator 11 is eliminated. The positive gate signal to the receiver and detector 16 should be terminated some time before the timing amplifier 29 is triggered "on." Were the receiver and detector gate signal terminated some time after the initiation of the timing amplifier gate signal, video pulses appearing in this period would, after a delay of one pulse period, emerge from the delay line during the time that amplifier 29 is gated "on" by the next succeeding gate signal. This, of course, would result in the video signal being passed to the TSBO and, if of sufficient amplitude, it would affect the triggering time of the same. Theoretically, proper operation would result if the gate signal of curve 4B terminated at the instant the gate signal of curve 4C was initiated. However, because of circuit tolerances and variations in circuit parameters, it is best to provide a "protective overlap" or "dead time" after cessation of the receiver-detector gate signal before initiation of the timing amplifier gate. Gates 32 and 33 are triggered by the pulse output from blocking oscillator 11 and these gates may comprise conventional multivibrator circuits.

As indicated above, pulse-to-pulse stability is also obtained by the novel feature of phase locking the twenty megacycle carrier signal entering the delay line to that emerging from the delay line. As shown in Fig. 1, the carrier signal is extracted from the amplifier 22 before detection and fed back to the carrier oscillator through the reactance tube amplifier 35. This carrier feedback is fed to the grid circuit of the reactance tube and thence injected into the grid circuit of the oscillator to force the oscillator into phase synchronism therewith. It has been found that the oscillator stabilizes or locks at a frequency which is an integral multiple of the reciprocal of the delay time of the delay line.

Since the radar pulse repetition frequency and the carrier signal are both synchronized with the delay period of the delay line, any changes in the delay time of the line will affect both to the same degree. Accordingly, the carrier signal will maintain a constant pulse-to-pulse phase relationship with respect to the timing signal pulses in spite of delay line changes due to temperature shifts and the like. Further, the video signals to be compared, which it will be recalled must be modulated onto the carrier signal, will have no pulse-to-pulse changes after detection due to changes in the relative phase of the carrier and video signals from one pulse to the next. It follows that both of these stabilizing effects will serve to improve fixed target cancellation.

Referring now to Fig. 2, the carrier signal from amplifier 22 is fed to the grid of the reactance tube 37 where it is amplified and then delivered to the grid circuit of oscillator 23 by means of coupling capacitor 36. The oscillator is a conventional Hartley circuit with the plate of the tube at RF ground potential and the output taken from the cathode. The inductance 38, with its distributed capacitance, forms the tank circuit of the oscillator. As stated above, the carrier signal injected into the oscillator grid circuit forces the oscillator into synchronism therewith.

The reactance tube amplifier circuit is also of conventional design. As will be understood by those skilled in the art, the reactance tube is connected across the frequency determining circuit (inductance 38) of the oscillator and appears to this circuit as a capacitive reactance whose magnitude varies with variations of its grid bias. Thus by manually controlling the setting of the potentiometer 39, the capacity of the tuned circuit of the oscillator can be varied and the oscillator frequency may thus be adjusted to any stable operating frequency within the limits of the reactance tube control. In practice, this control is adjusted until a particular carrier frequency is found which provides the best fidelity of transmission through the delay line. That is, that carrier frequency is selected which results in minimum distortion of the video signals transmitted through the delay line and this in turn is evidenced by maximum fixed target cancellation. This selected carrier frequency will be some integral multiple of the reciprocal of the delay period of the delay line.

In Fig. 3 there is shown the circuit diagram of the timing signal blocking oscillator 11. This circuit is of conventional design with the triggering pulses from either the timing amplifier or FRBO, as the case may be, fed to the plates 46 of the parallel connected triodes 47 and the output taken from the cathodes 48. Potentiometer means 41 is used to provide a predetermined amount of negative bias to the grids 49. The time constant product of the effective resistance of potentiomter 41 and grid-circuit-to-cathode condenser 50 is one half the repetition period of the delay line or less (depending upon the setting of potentiometer 41). Therefore, condenser 50 is substantially discharged and its rate of discharge appreciably retarded at the time of arrival of the following timing signal, thus presenting essentially constant triggering conditions to each timing signal.

Figure 5:
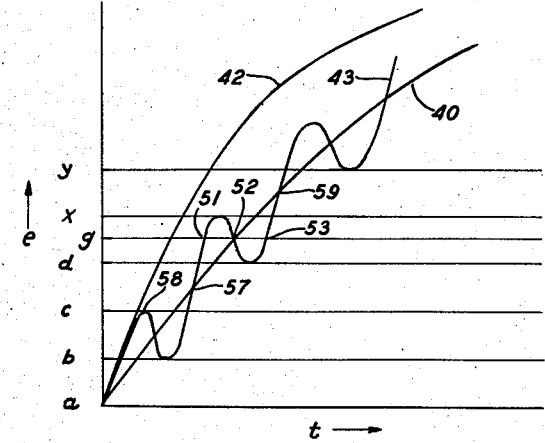
Fig. 5 is a diagram useful in explaining a feature of the present invention.

Referring now to Fig. 5, the curve 42 illustrates the "rise" portion or leading edge of the pulse produced by the blocking oscillator 11 and curve 43 illustrates this same pulse after passage through the delay line and detection in peak detector 20. The leading edge of this delayed detected pulse is somewhat distorted in that it includes a ripple caused by modulating the original pulse with the carrier signal. To detect the delayed pulse by the use of conventional detector means would result in a pulse with a leading edge such as that illustrated by curve 40, wherein the ripple is smoothed or filtered out. From a comparison of the waveforms of Fig. 5 and the discussion to follow, it will be seen that a high degree of stability of the timing cycle can be achieved by peak detecting the delayed pulse and using the same to trigger the blocking oscillator 11.

Those portions of the peak detected, delayed pulse wavefront (curve 43) lying between points $a$—$b$, $c$—$d$, and $x$—$y$ have a faster rise-time than corresponding portions of the pulse wavefront represented by curve 40; that is, these portions possess a higher positive slope $$\left(\frac{de}{dt}\right)$$

Accordingly, by causing the blocking oscillator to be triggered at the point 57 or 59, for example, of the wavefront 43, small changes in the voltage of the bias supply for the blocking oscillator will only negligibly affect the instant of triggering, whereas, if the oscillator were triggered at any particular point on the wavefront 40, these same small changes would more substantially affect the instant of triggering.

Considering the curve 43 in more detail, it will be seen that those voltage amplitudes between the points $a$—$b$, $c$—$d$ and $x$—$y$ will occur only once during the "rise" portion of the pulse, whereas between the points $b$—$c$ and $d$—$x$, for example, any one voltage amplitude may occur several times. A voltage amplitude of $g$ for instance occurs at points 51, 52 and 53 in the wavefront. To eliminate any possible triggering time ambiguity, it is desirable that the blocking oscillator operation be triggered at a point in the leading edge of the delayed, peak detected pulse lying between the fast rise-time portions $a$—$b$, $c$—$d$, or $x$—$y$. Poor stability of the timing cycle has been experienced when the blocking oscillator was triggered by that portion of the delayed pulst lying between points $d$—$x$, for example. The potentiometer means 41, by control of the blocking oscillator grid bias, determines the instant of oscillator firing in response to the input trigger pulse.

While the foregoing disclosure relates the improved timing and cancellation circuits to their particular utility in radar MTI apparatus, it should be understood that the circuits can find application in other and different environments. For example, the improved timing features of the present invention could find application in the storage or memory portion of a computing system.

It should be understood, therefore, that the foregoing disclosure relates to only a preferred embodiment of the invention and numerous modifications or alterations may be made therein without departing from the spirit and scope of the invention.

What is claimed is:

1. In a timing circuit adapted for use in a moving target indicating system, means for generating timing signal pulses in response to input triggering pulses, a carrier oscillator, means receiving the carrier signal from said carrier oscillator and modulating the same with the timing signal pulses from said timing signal generating means, a delay line operative to delay the output of said modulating means for a predetermined period of time, detector means responsive to the output of said delay line for deriving delayed versions of said timing signal pulses, means for applying the delayed timing signal pulses as input triggering pulses to said timing signal generating means, and means for feeding back a portion of the carrier output of said delay line to the input of the carrier oscillator to phase lock the carrier signal of said oscillator to the carrier output of said delay line.

2. In a timing circuit adapted for use in a moving target indicating system, means for generating timing signal pulses in response to input triggering pulses, a carrier oscillator, means receiving the carrier signal from said carrier oscillator and modulating the same with the timing signal pulses from said timing signal generating means, a delay line operative to delay the output of said modulating means for a predetermined period of time, detector means responsive to the output of said delay line for deriving delayed versions of said timing signal pulses, means for applying the delayed timing signal pulses as input triggering pulses to said timing signal generating means, means for feeding back a portion of the carrier output of said delay line to the input of the carrier oscillator to phase lock the carrier signal of said oscillator to the carrier output of said delay line, and means coupled to the frequency determinative circuit of said oscillator operable to adjust the frequency of the carrier signal of said oscillator to a value that provides maximum fidelity of transmission through said delay line.

3. In a timing circuit adapted for use in a moving target indicating system, means for generating timing signal pulses in response to input triggering pulses, a carrier oscillator, means receiving the carrier signal from said carrier oscillator and modulating the same with the timing signal pulses from said timing signal generating means, a delay line operative to delay the output of said modulating means for a predetermined period of time, peak detector means responsive to the output of said delay line for deriving delayed versions of said timing signal pulses, means for applying the peak detected timing signal pulses as input triggering pulses to said timing signal generating means, means for setting the bias of said timing signal generating means so that the same is triggered into operation at a point in the fast rise-time portion of the leading edge of the input trigger pulses, and means for feeding back a portion of the carrier output of said delay line to the input of the carrier oscillator to phase lock the carrier signal of said oscillator to the carrier output of said delay line.

4. In a timing system adapted for use in a moving target indicating radar, means for generating timing signal pulses, bias means preventing the generation of said timing signal pulses except in response to input triggering pulses of predetermined magnitude, a carrier oscillator, means receiving the carrier signal from said carrier oscillator and modulating the same with the timing signal pulses from said timing signal generating means, a delay line operative to delay the output of said modulating means for a predetermined period of time, detector means responsive to the output of said delay line for deriving delayed versions of said timing signal pulses, means for applying the delayed timing signal pulses as input triggering pulses to said timing signal generating means, means for feeding back a portion of the carrier output of said delay line to the input of the carrier oscillator to phase lock the carrier signal of said oscillator to the carrier output of said delay line, a free-running pulse producing means for providing an input triggering pulse to said timing signal generating means to overcome the bias thereof and initiate operation of the system, the last recited means free-running at a rate which is slower than the timing signal pulse rate as determined by said delay line and being reset each time the timing signal generating means is triggered into operation.

5. In a moving target indicating system, transmitter means operative when triggered to transmit a pulse of high frequency energy, receiver means operative to receive echoes of the transmitted pulse reflected by remote objects, means for generating timing signal pulses in response to input triggering pulses, means applying said timing signal pulses to said transmitter means for triggering the same, a carrier oscillator, means receiving the carrier signal from said carrier oscillator and modulating the same with the timing signal pulses from said timing signal generating means and the video signals from said receiver means, a delay line operative to delay the output of said modulating means for a predetermined period of time, detector means responsive to the output of said delay line for deriving delayed versions of said timing signal pulses and said video signals, means for applying the delayed timing signal pulses as input triggering pulses to said timing signal generating means, means for comparing the relative amplitudes of said video signals with the delayed versions thereof, and means for feeding back a portion of the carrier output of said delay line to the input of the carrier oscillator to phase lock the carrier signal of said oscillator to the carrier output of said delay line.

6. In a moving target indicating system, transmitter means operative when triggered to transmit a pulse of high frequency energy, receiver means operative to receive echoes of the transmitted pulse reflected by remote objects, means for generating timing signal pulses in response to input triggering pulses, means applying said timing signal pulses to said transmitter means for triggering the same, a carrier oscillator, means receiving the carrier signal from said carrier oscillator and modulating the same with the timing signal pulses from said timing signal generating means and the video signals from said receiver means, a delay line operative to delay the output of said modulating means for a predetermined period of time, detector means responsive to the output of said delay line for deriving delayed versions of said timing signal pulses and said video signals, means for applying the delayed timing signal pulses as input triggering pulses to said timing signal generating means, means for comparing the relative amplitudes of said video signals with the delayed versions thereof, means for feeding back a portion of the carrier output of said delay line to the input of the carrier oscillator to phase lock the carrier signal of said oscillator to the carrier output of said delay line, and means coupled to the frequency determinative circuit of said oscillator operable to adjust the frequency of the carrier signal of said oscillator to a value that provides maximum fidelity of transmission through said delay line.

7. In a moving target indicating system, transmitter means operative when triggered to transmit a pulse of high frequency energy, receiver means operative to receive echoes of the transmitted pulse reflected by remote objects, means for generating timing signal pulses in response to input triggering pulses, means applying said timing signal pulses to said transmitter means for triggering the same, a carrier oscillator, means receiving the carrier signal from said carrier oscillator and modulating the same with the timing signal pulses from said timing signal generating means and the video signals from said receiver means, a delay line operative to delay the output of said modulating means for a predetermined period of time, peak detector means responsive to the output of said delay line for deriving delayed versions of said timing signal pulses, means for applying the peak detected timing signal pulses as input triggering pulses to said timing signal generating means, means for setting the bias of said timing signal generating means so that the same is triggered into operation at a point in the fast rise-time portion of the leading edge of the input trigger pulses, additional detector means responsive to the output of said delay line for deriving delayed versions of said video signals, means for comparing the relative amplitudes of said video signals with the delayed versions thereof, and means for feeding back a portion of the carrier output of said delay line to the input of the carrier oscillator to phase lock the carrier signal of said oscillator to the carrier output of said delay line.

8. In a moving target indicating system, transmitter means operative when triggered to transmit a pulse of high frequency energy, receiver means operative to receive echoes of the transmitted pulse reflected by remote objects, means for generating timing signal pulses, bias means preventing the generation of said timing signal pulses except in response to input triggering pulses of predetermined magnitude, means applying the generated timing signal pulses to said transmitter means for triggering the same, a carrier oscillator, means receiving the carrier signal from said carrier oscillator and modulating the same with the timing signal pulses from said timing signal generating means and the video signals from said receiver means, a delay line operative to delay the output of said modulating means for a predetermined period of time, detector means responsive to the output of said delay line for deriving delayed versions of said timing signal pulses and said video signals, means for applying the delayed timing signal pulses as input triggering pulses to said timing signal generating means, means for comparing the relative amplitudes of said video signals with the delayed versions thereof, means for feeding back a portion of the carrier output of said delay line to the input of the carrier oscillator to phase lock the carrier signal of said oscillator to the carrier output of said delay line, and free-running pulse producing means for providing an input triggering pulse to said timing signal generating means to overcome the bias thereof and initiate operation of the system, the last recited means free-running at a rate which is slower than the timing signal pulse rate as determined by said delay line and being reset each time the time signal generating means is triggered into operation.

9. In a moving target indicating system, transmitter means operative when triggered to transmit a pulse of high frequency energy, receiver means operative to receive echoes of the transmitted pulse reflected by remote objects, means for generating timing signal pulses in response to input triggering pulses, means applying said timing signal pulses to said transmitter means for triggering the same, a carrier oscillator, means receiving the carrier signal from said carrier oscillator and modulating the same with the timing signal pulses from said timing signal generating means and the video signals from said receiver means, a delay line operative to delay the output of said modulating means for a predetermined period of time, means for feeding back a portion of the carrier output of said delay line to the input of the carrier oscillator to phase lock the carrier signal of said oscillator to the carrier output of said delay line, peak detector means responsive to the output of said delay line for deriving delayed versions of said timing signal pulses, means for applying the peak detected timing signal pulses as input triggering pulses to said timing signal generating means, means for setting the bias of said timing signal generating means so that the same is triggered into operation at a point in the fast rise-time portion of the leading edge of the input trigger pulses, gating means operative in response to the generated timing signal pulses to prevent the triggering of said timing signal generating means by received noise or video signals, additional detector means responsive to the output of said delay line for deriving delayed versions of said video signals, and means for comparing the relative amplitudes of said video signals with the delayed versions thereof.

10. In a moving target indicating system, transmitter means operative when triggered to transmit a pulse of high frequency energy, receiver means operative to receive echoes of the transmitted pulse reflected by remote objects, means for generating timing signal pulses, bias means preventing the generation of said timing signal pulses except in response to input triggering pulses of predetermined magnitude, means applying the generated timing signal pulses to said transmitter means for triggering the same, a carrier oscillator, means receiving the carrier signal from said carrier oscillator and modulating the same with the timing signal pulses from said timing signal generating means and the video signals from said receiver means, a delay line operative to delay the output of said modulating means for a predetermined period of time, means for feeding back a portion of the carrier output of said delay line to the input of the carrier oscillator to phase lock the carrier signal of said oscillator to the carrier output of said delay line, means coupled to the frequency determinative circuit of said oscillator operable to adjust the frequency of the carrier signal of said oscillator to a value that provides maximum fidelity of transmission through said delay line, peak detector means responsive to the output of said delay line for deriving delayed versions of said timing signal pulses, means for applying the peak detected timing signal pulses as input triggering pulses to said timing signal generating means, the aforementioned bias means including means for setting the bias of said timing signal generating means so that the same is triggered into operation at a point in the fast rise-time portion of the leading edge of the input trigger pulses, gating means operative in response to the generated timing signal pulses to prevent the triggering of said timing signal generating means by received noise or video signals, additional detector means responsive to the output of said delay line for deriving delayed versions of said video signals, means for comparing the relative amplitudes of said video signals with the delayed versions thereof, and free-running pulse producing means for providing an input triggering pulse to said timing signal generating means to overcome the bias thereof and initiate operation of the system, the last recited means free-running at a rate which is slower than the timing signal pulse rate as determined by said delay line and being reset each time the timing signal generating means is triggered into operation.

No references cited.